US008856605B2

(12) United States Patent
Luo et al.

(10) Patent No.: US 8,856,605 B2
(45) Date of Patent: Oct. 7, 2014

(54) METHOD FOR TRANSMITTING DATA TO USER EQUIPMENTS, COMMUNICATION SYSTEM, BASE STATION AND USER EQUIPMENT

(75) Inventors: Jijun Luo, München (DE); Egon Schulz, München (DE); Wolfgang Zirwas, München (DE)

(73) Assignee: Nokia Siemens Networks Oy, Espoo (FI)

( * ) Notice: Subject to any disclaimer, the term of this patent is extended or adjusted under 35 U.S.C. 154(b) by 300 days.

(21) Appl. No.: 12/863,054

(22) PCT Filed: Feb. 11, 2009

(86) PCT No.: PCT/EP2009/051521
§ 371 (c)(1),
(2), (4) Date: Jul. 15, 2010

(87) PCT Pub. No.: WO2009/101088
PCT Pub. Date: Aug. 20, 2009

(65) Prior Publication Data
US 2010/0293428 A1 Nov. 18, 2010

(30) Foreign Application Priority Data

Feb. 12, 2008 (EP) .................................... 08002557

(51) Int. Cl.
*G08C 25/02* (2006.01)
*H04L 1/18* (2006.01)
*H04H 40/00* (2008.01)
*H04W 4/00* (2009.01)
*H04W 24/00* (2009.01)
*H04B 7/00* (2006.01)

(52) U.S. Cl.
USPC ........... 714/748; 370/336; 370/280; 370/294; 370/321; 455/3.06; 455/422.1; 455/456.6; 455/524

(58) Field of Classification Search
None
See application file for complete search history.

(56) References Cited

U.S. PATENT DOCUMENTS

| 5,361,399 | A | * | 11/1994 | Linquist et al. | ............ | 455/412.2 |
| 5,633,876 | A |   | 5/1997  | Dinkins        | ........     | 370/315   |
| 8,228,853 | B2| * | 7/2012  | Ji et al.      | ..........   | 370/329   |

FOREIGN PATENT DOCUMENTS

| EP | 0 497 490 A2 | 8/1992 |
| EP | 1 509 043 A1 | 2/2005 |
| EP | 1 677 443 A1 | 7/2006 |
| GB | 2 374 770 A  | 10/2002 |
| WO | WO 2005/067173 A1 | 7/2005 |
| WO | WO 2007/058067 A1 | 5/2007 |

* cited by examiner

*Primary Examiner* — Guerrier Merant
(74) *Attorney, Agent, or Firm* — Harrington & Smith

(57) ABSTRACT

A method is provided for transmitting data to user equipments, a communication system, a base station and a mobile station. Data is transmitted to user equipments from a first base station (BBS) and from second base stations (CBS) in a time division multiplexed manner in frames (F). Each frame (F) has a first sub-frame and a second sub-frame. The user equipments are located in cells, each cell a second base station (CBS). Data is transmitted wirelessly, during a first sub-frame of a frame, data from the first base station (BBS) to user equipments in a plurality of cells. Data is transmitted wirelessly, during the second sub-frame of the frame (F), from second base station (CBS) to at least one the plurality of user equipments. The data being transmitted from the first base station (BBS) is also transmitted by the second base station (CBS) to at least one of the plurality of cells.

22 Claims, 4 Drawing Sheets

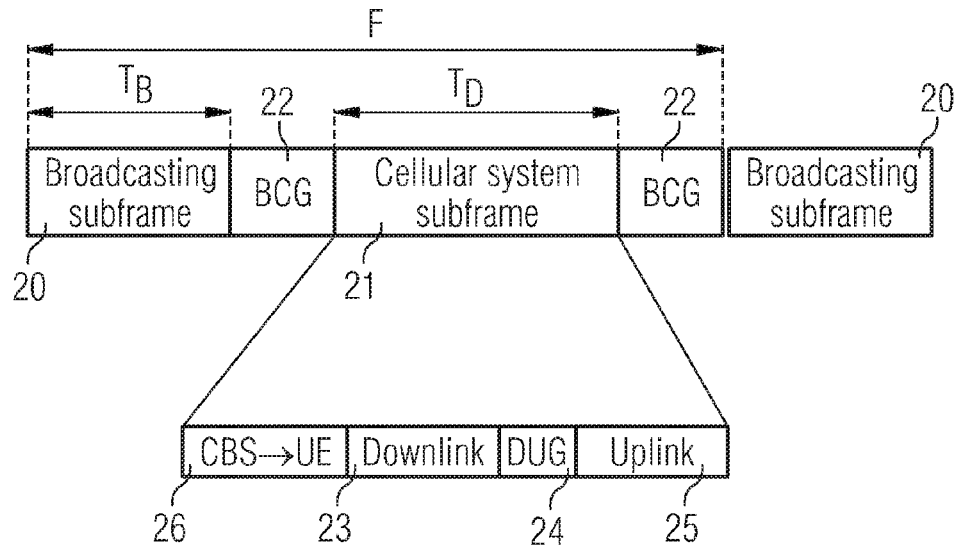
FIG 3
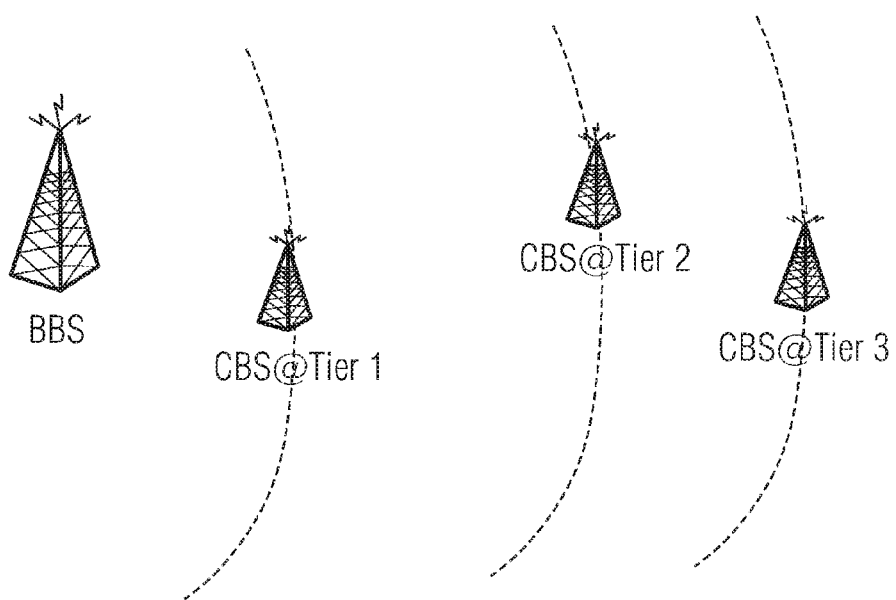
FIG 4
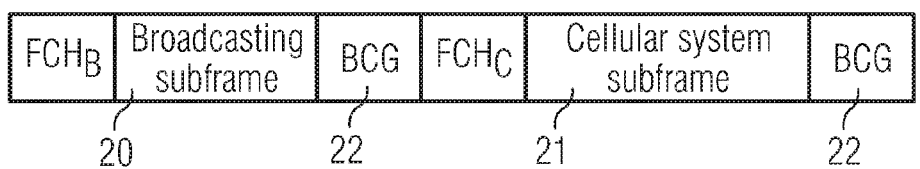

METHOD FOR TRANSMITTING DATA TO USER EQUIPMENTS, COMMUNICATION SYSTEM, BASE STATION AND USER EQUIPMENT

The invention relates to a method for transmitting data to user equipments, to a communication system, to a base station and to a user equipment. Integrated heterogeneous networks, e.g. for the so-called broadband wireless access (BWA) have become one of the major directions for evolving both broadband access and mobile communications. Such a system is a new type of "triple-play" broadband wireless access (BWA) network which use the broadband internet a secure network and integrate the terrestrial digital television broadcasting system with the BWA system.

The EP 1 509 043A1 shows a DVB-H (Digital Video Broadcast-H) system for transmitting encoded video data in form of bursts. DVB-H employs a time division multiplexing transmission scheme and transmits the data in time slices of bursts. If a burst was not entirely transmitted to a receiver, the transmission is repeated. However this transmission scheme is less effective as the bandwidth during the transmission time slices is reduced.

Hence, it is one object of the invention to provide a method for transmitting data to user equipment in an efficient manner. It is an further object of the invention to provide a method for receiving, by a user equipment data in a less bandwidth consuming manner. It is also an object to provide a communications system that provides an efficient transmission of data to user equipments and a further object is to provide a user equipment for receiving wirelessly data in an efficient manner.

It is provided a method for transmitting data to user equipments from a first base station and from a second base station in a time division multiplex manner. The transmission takes place in frames, whereby each frame comprises a first sub-frame and a second sub-frame. The user equipments are located in cells and each of these cells comprises a second base station. During a first sub-frame of the frame, data is transmitted wirelessly from the first base station to user equipments in a plurality of cells. A user equipment may be e.g. a mobile phone or a laptop computer.

During the second sub-frame of the frame, data is transmitted from the second base station to at least one of the plurality of user equipments. The data that is transmitted wirelessly from the first base station to the user equipments is at least partially also transmitted by the second base station to at least one of the user equipments. As will be described later, it depends on the embodiment, if the complete data being transmitted wirelessly from the first base station to the user equipments is retransmitted by the second base station of if only a part of that data is retransmitted.

This method provides a possibility to send the data to user equipments twice. It takes advantage of the fact that the user equipments are connected to the second base stations and preferably makes use of the bandwidth during the second sub-frame. In comparison to the DVB-H, not only the first base station is used for broadcasting the broadband data, but also the second base station retransmits data e.g. for badly received data packets. Therefore, the efficiency for transmitting data from the first base station is increased.

In an embodiment, the second base station receives data from the first base station during the first sub-frame and retransmits wirelessly this data to at least one of the plurality of user equipments. As the second base stations are in the range of the first base station, they can receive the data wirelessly which eases the synchronization between the first and the second base stations.

If the second base station retransmits the data at least partially during the second sub-frame, the user equipment may easily distinguish between the data coming from the first base station and coming from the second base station. This makes it easier to recombine the data being originally sent by the first base station and the data being retransmitted by the second base station.

If the second base station retransmits the data at least partially during the first sub-frame, the bandwidth of the first sub-frame is used more efficiently.

In an embodiment, the first base station sends the same data in a first frequency domain and concurrently in a second frequency domain. This makes it possible to distinguish the modulation-coding schemes between user equipments being located far from the first base station from those user equipments being located close to the first base station. The closer user equipments may receive the data from the first base station with higher rate.

The second base station may retransmit the data upon request of one of the user equipments. Upon request the second base station sends the data to the user equipment that has sent the request. This lowers the energy consumption of user equipment because it receives the retransmitted data only if required.

If the request is a negative acknowledgement signal, the acknowledgement signal may only be sent if the retransmission is needed to further save energy in the user equipment and in the second base station.

If the negative acknowledgement signal includes an information on which of the data packets are to be retransmitted, the number of retransmitted data packets may be further reduced and only the necessary data packets are retransmitted.

If the second base station retransmits the data during that frame in which the second base station receives data from the first base station, the complete broadcasting information inclusive the retransmitted data is received within one frame. This increases the speed for receiving the broadcast information and saves the amount of storage for the received data.

In an embodiment, the data being retransmitted by the second base station is coded by same modulation-coding scheme (MCS) as the modulation-coding scheme that was used by the first base station to code said data packet. This also eases the decoding of the data because the user equipment needs just one decoding algorithm for both the data from the first base station and the retransmitted data from the second base station.

The retransmitted data may be transmitted in a forwarding phase, which is part of the second sub-frame. According to a further embodiment, the second base station sends an information to the user equipment indicating the length of the forwarding phase. In this embodiment, the length of the forwarding phase is flexible such that the length of the forwarding phase depends on how many data packets are retransmitted in the forwarding phase.

It is also provided a method for receiving, by a user equipment, data in frames, whereby each frame has a first sub-frame and a second sub-frame. The user equipment receives in a first sub-frame data packets from the first base station, decodes this data and sends a request for data packets that were received from the first base station with errors to the second base station. This enables a transmission of data from the first base station with a high bandwidth because the data being received with errors is requested from the first base station. Preferably, the request is a negative acknowledgement request such that the request is only sent if a retransmission is necessary.

It is also provided a base station for transmitting data to user equipments in a time division multiplex manner in frames with a first sub-frame and a second sub-frame. A transmit unit is provided for transmitting wirelessly data from the second base station to the plurality of user equipments during the second sub-frame of the frame. The base station comprises a first receive unit to receive wirelessly data during the first sub-frame from another base station and a retransmit unit for retransmitting wirelessly data received by the receive unit to at least one of the plurality of user equipments. It depends on the embodiment, if all of the data received by the receive unit is retransmitted or if only selection of that data is retransmitted.

In an embodiment, the base station comprises a second receive unit for receiving a request from the user equipment for retransmitting data, whereby the request is forwarded to retransmit unit to retransmit the data only if requested to make sure that the retransmission takes only place if it is needed.

It is also provided a user equipment for receiving wirelessly data from a first base station and from a second base station in frames. A receive unit is provided for receiving data packets from a first base station during the first sub-frame.

A decode unit is provided for decoding data received from the first base station and an acknowledgement unit is provided for sending to the second base station a request for data packets that were not entirely received from the first base station.

It is also provided a communication system for transmitting data to user equipment from a first base station and from a second base station in a time division multiplex manner, the transmission being provided in frames, whereby each frame has a first sub-frame and a second sub-frame. The communication system further comprises the first base station for transmitting wirelessly data to a plurality of user equipments during a first sub-frame.

A second base station is provided for transmitting wirelessly data during a second sub-frame to the plurality of user equipments. The second base station comprises a receive unit to receive data from the first base station during the first sub-frame and a retransmit unit for retransmitting wirelessly the data received from the first base station to at least one of the plurality of user equipments. Again, it depends on the embodiment, if all of the data received by the receive unit is retransmitted or if only a selection of that data is retransmitted.

This communication system enables an efficient transmission of broadband data from the first base station to the user equipment making use of a relay function of the second base station.

Embodiments of the invention are now demonstrated with help of the drawings.

FIG. 3 shows a frame structure according to a first embodiment of the invention.

FIG. 4 shows the locations of the cellular base stations in respect to the broadcast base station.

Figure 1:
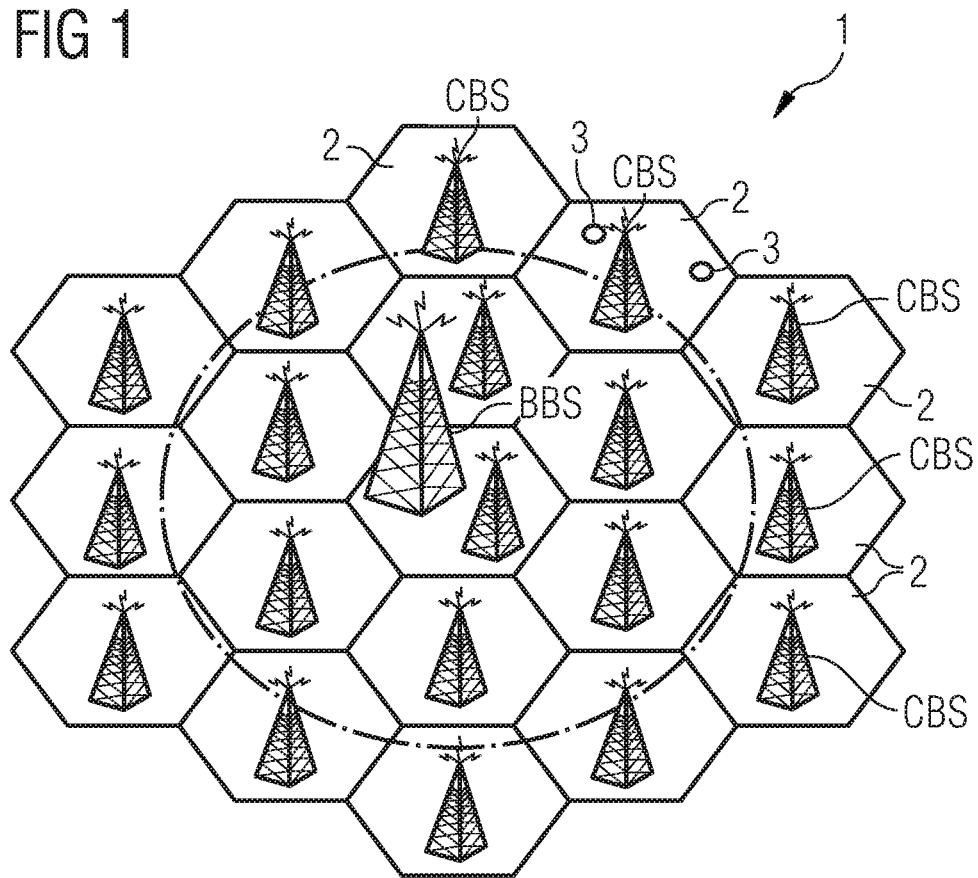
FIG. 1 shows a communication system with a broadband base station and a plurality of cellular base stations.

FIG. 1 shows an embodiment of a communication system 1 with a plurality of base stations. The communication system 1 is divided into a plurality of cells 2. In each cell 2, a second base station, a so-called cellular base station (CBS) is located to provide wireless telecommunication services to the user equipments 3 being inside the respective cell 2. In one of the cells 2 a first base station, the so-called broadband base station (BBS) is arranged to provide additional services to the user equipments 3 of a plurality of cells 2. The broadband base station BBS carries out broadcasting services like television and video, where as a cellular base station CBS is responsible to provide classical wireless services such as voice and data.

The described integrated system harmonizes the mobile IP network and the broadband wireless access. From the frequency deployment point of view, a single frequency network (SFN) is used. This means, that the broadcast base stations BBS uses the same frequency domains as the cellular base station CBS. In other words, the cellular base station and the broadcast base station have to share the same frequency band due to limitations of the frequency spectrum.

Figure 2:
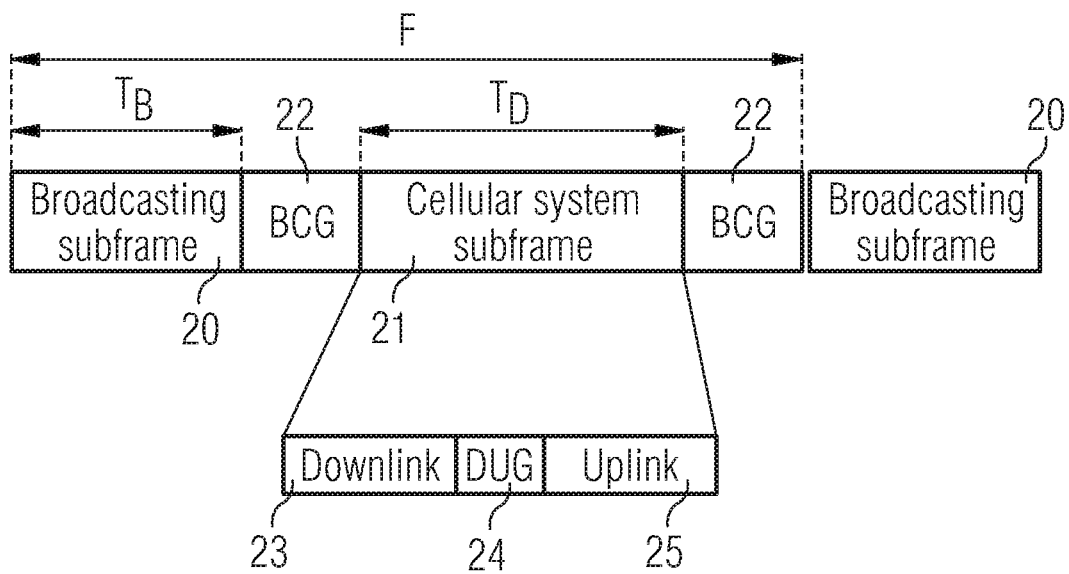
FIG. 2 shows the basic frame structure for transmitting data from the base stations to a plurality of user equipments.

FIG. 2 shows a frame structure for the downlink of data from the broadcasting base station and from the cellular base station to the user equipment. The frame F comprises a first sub-frame 20, which is called the broadcasting sub-frame because data is sent from the broadcasting base station to plurality of the user equipments during this first sub-frame 20. A second sub-frame 21 of the frame F is used for the communication between the cellular base station CBS and the plurality of user equipments 3. The second sub-frame 21 is divided into a downlink 23, a downlink-uplink guard 24 and a uplink 25. During the downlink 23, voice and data is sent from the cellular base station CBS to the user equipments 3. The downlink uplink guard 24 must be sufficiently long to account for the signal propagation between the base station CBS and the user equipment 3. During the uplink 25, the user equipment 3 transmits voice and data to the cellular base station CBS.

Between the first sub-frames 20 and the second sub-frames 21 and between the second sub-frames 21 and the first sub-frames 20, broadcast cellular guards 22 are inserted to ensure that the transmissions of the broadcasting base station BBS, the cellular base stations CBS and the user equipments UE do not overlap.

The cellular base station and the broadband base station are only timely synchronized and transmit data in a time division multiplex (TDM) manner.

To transmit the first sub-frame, a transmission time $T_B$ is needed, whereas the transmission of the second sub-frame 21 takes $T_D$.

FIG. 3 shows a first embodiment of a frame structure for the communication between a broadcasting base station BBS, a cellular base station CBS and user equipments 3. Elements with same function as in the preceding figures marked with the same reference numbers. In comparison to FIG. 2, the second sub-frame 21 further comprises a forwarding phase 26.

During the first sub-frame 21, the cellular base station CBS receives the signals being sent from the broadcasting base station BBS. The cellular base station CBS de-modulates and decodes the signals and prepares the forwarding of this information. In the forwarding phase 26, the information received from the broadcasting base station BBS is forwarded to the user equipment 3. In FIG. 3, the information carried by the first sub-frame 20 of the same frame F is completely forwarded. The cellular base station CBS does not necessarily use the same modulation-coding scheme in the forwarding phase 26 as the broadcasting base station BBS.

The cellular base station CBS performs a relay function to carry the broadcasting information. This is especially useful for remote users being located in cells far away from the next broadcasting base station BBS. The frame structure makes it possible to use a high modulation scheme by the broadcasting base station BBS as the remote users get the data from the cellular base station CBS. High-rate modulation coding schemes (MSC) are used to improve the transmission efficiency.

FIG. 4 shows the location of the cellular base stations CBS in respect to the broadcasting base station BBS. The cellular base stations CBS are located at different tiers with respect to the location of the broadcasting base station. The distance between one tier to the next tier is about one kilometer and one broadcasting base station may cover up to ten tiers which corresponds to a distance of ten kilometers from the broadcasting base station to the last cell 2.

The user equipments in different tiers receive the signals from the broadcasting base station with different signal strength. The demand for the relay function is accordingly different in different tiers.

Therefore, the medium access controller (MAC) frame is designed to allow a non-excessive allocation of resources for forwarding the signal if the signal from the broadcasting base station is good enough for the user equipment.

At the beginning of the forwarding phase 26, a cellular frame control channel $FCH_C$ is provided. This cellular frame control signal $FCH_C$ indicates the duration and the modulation-coding scheme for the forwarding phase 26 from the cellular base station CBS to the user equipment 3. The cellular frame control channel signal $FCH_C$ depends on the tier. User equipments 3 in the inner tiers are expected to receive most of the first sub-frame 20 with a good quality. The duration of the forwarding phase 26 is accordingly smaller than the duration of the forwarding phase 26 of user equipments 3 in the outer tiers.

In addition, a broadcast frame control channel $FCH_B$ signal is provided at the beginning of each broadcasting sub-frame to indicate the duration and the modulation-coding scheme of the first sub-frame 20. The use of the frame control channel signals $FCH_B$ and $FCH_C$ ensures that the allocation of resources is not excessive if the transmission during the broadcasting phase is good enough for the user equipments.

Figure 5:
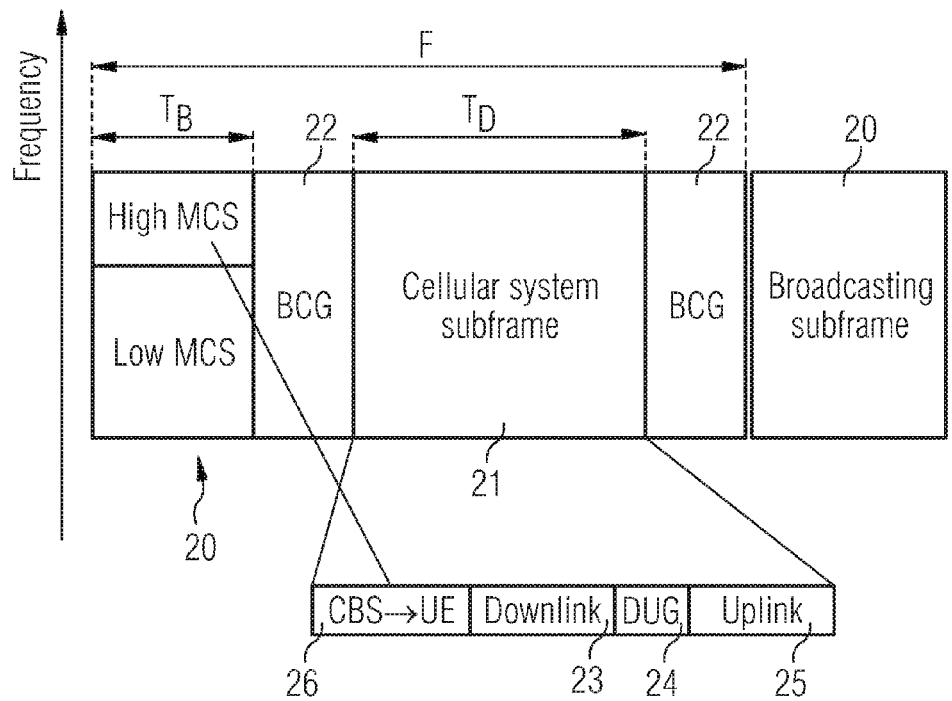
FIG. 5 shows a second embodiment of the frame structure for the transmission from the base stations to a user equipment.

FIG. 5 shows a second embodiment of the frame structure F. The first sub-frame 10, in which the data is sent from the broadcasting base stations BBS to the user equipment 3, is partitioned in respect to frequency. The broadcasting base station sends the data in two different modulation coding schemes (MCS), a high-rate MCS and a low-rate MCS. In one embodiment, the base stations may transmit data in the 700-720 MHz band. The high MCS is provided with frequencies between 715 MHz to 720 MHz. The coding of the low MCS uses the 700 MHz to 715 MHz band.

This partitioning of the frequency domain may be especially adapted for OFDMA (orthogonal frequency-division multiplexing) or GMC (generalized multi-carrier) downlinks.

To further increase the efficiency, the cellular base station starts the forwarding phase 26 already during the first sub-frame. To ensure that the transmissions of the broadband base station and of the cellular base station do not interfere, the frequency domain may be partitioned between first and the second base station.

The GMC and the OFMDA modulation schemes are high candidates for the downlink. Accordingly, the frequency resources are scalable and the MCS level during the broadcasting sub-frame are differentiated. The content can be carried by different modulation coding schemes with proper resource allocation. The low MCS are used for most of the user equipments 3, whereas the high modulation-coding scheme is used for the better-connected user equipments 3. It is up to the forwarding phase 26 to cater for the worse connected user equipments 3. The modulation coding scheme selection and the partitioning scheme is up to the radio resource control (RRC). The radio resource control (RRC) protocol is part of the third layer and is used to ensure the signalling between user equipments 3 and the UTRAN (UMTS Radio Access Network).

Figure 6:
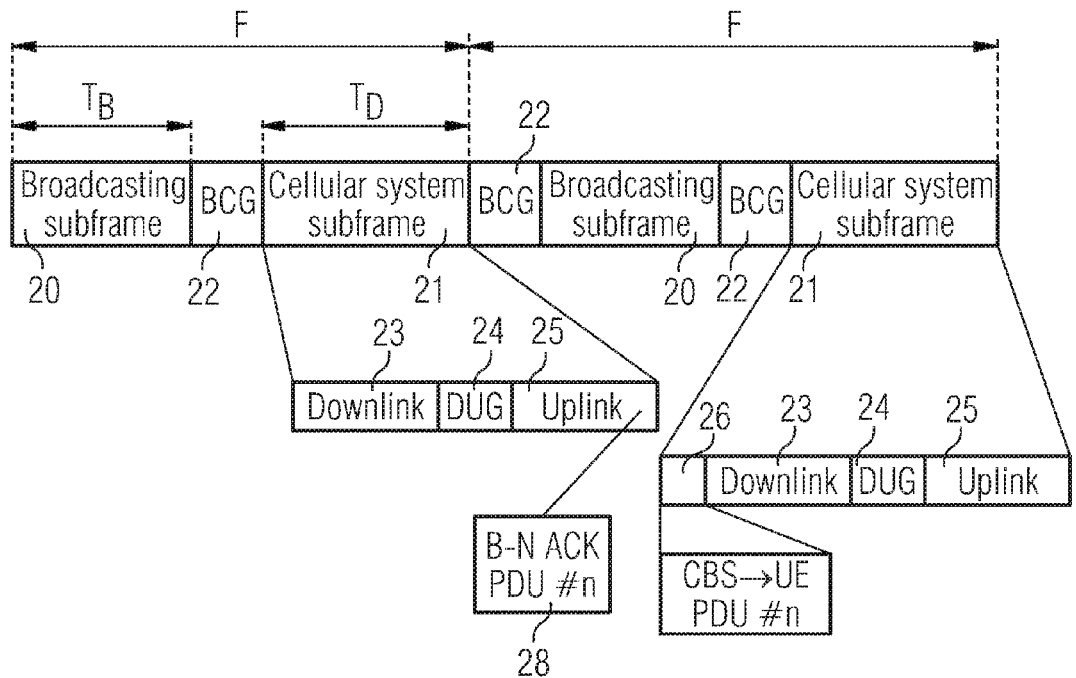
FIG. 6 shows a third embodiment of the frame structure for the transmission of data from base stations to a user equipment.

FIG. 6 shows a third embodiment for the frame structure, in which the retransmission of the data is provided on-demand from the cellular base stations CBS.

The broadcasting base station BBS transmits data packets with a numbering, each data packet being termed by a RLC PDU (Radio Link Control Protocol Data Unit) number. For urgent traffic in the broadcasting channel, an interleaving depth on the RLC PDU should not exceed the first sub-frame 20. During the first sub-frame 20, the cellular base station receives the data packets from the broadcasting base station BBS and store these data packets. The user equipment can acknowledge the reception of the data packet and its quality immediately during the second sub-frame 21 of the same frame F.

During the uplink 25 of the second sub-frame 21 of the same frame F, the user equipment sends a negative broadcast acknowledgement (B-NACK) associated with the RLC PDU number if the data packet was not entirely received. The cellular base station CBS stores the information which user equipment 3 wrongly received data packets and which modulation-coding scheme was used for these packets.

The cellular base station immediately resends the packets to the user equipment comprising the RLC PDU number and the chosen MCS level. For resending, the same coding scheme as for the original transmission may be used.

The user equipment performs a combination of the resent data with the originally broadcasting protocol data unit (PDU). The number of retransmissions is configured by the radio resource control (RRC).

According to the receiving window size configured by the radio resource control (RRC), the user equipment performs the reordering and in-sequence delivering to the higher layers.

Figure 7:
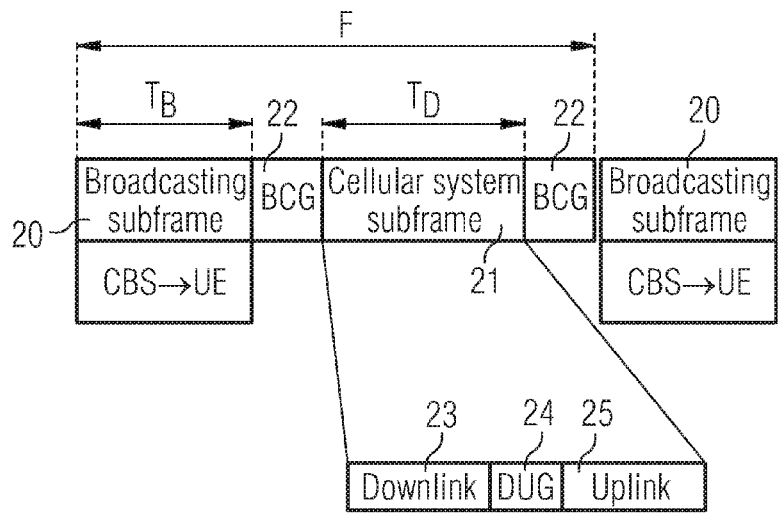
FIG. 7 shows a fourth embodiment of the frame structure for the transmission of data from base stations to user equipments.

FIG. 7 shows a fourth embodiment of the frame structure F.

The second sub-frame 21 only comprises the downlink 23, the uplink 25 and the downlink-uplink guard DUG 24. During the broadcasting sub-frame the cellular base station CBS sends the same data as the broadcasting base station BBS to the user equipment 3. The broadcasting base station BBS and the cellular base station CBS are connected to the same backhaul network from which they get the data. The cellular base station CBS transmits the same traffic as the broadcasting base station BBS. The user equipment 3 is able to receive the same signal twice, such that diversity gain is obtained.

Figure 8:
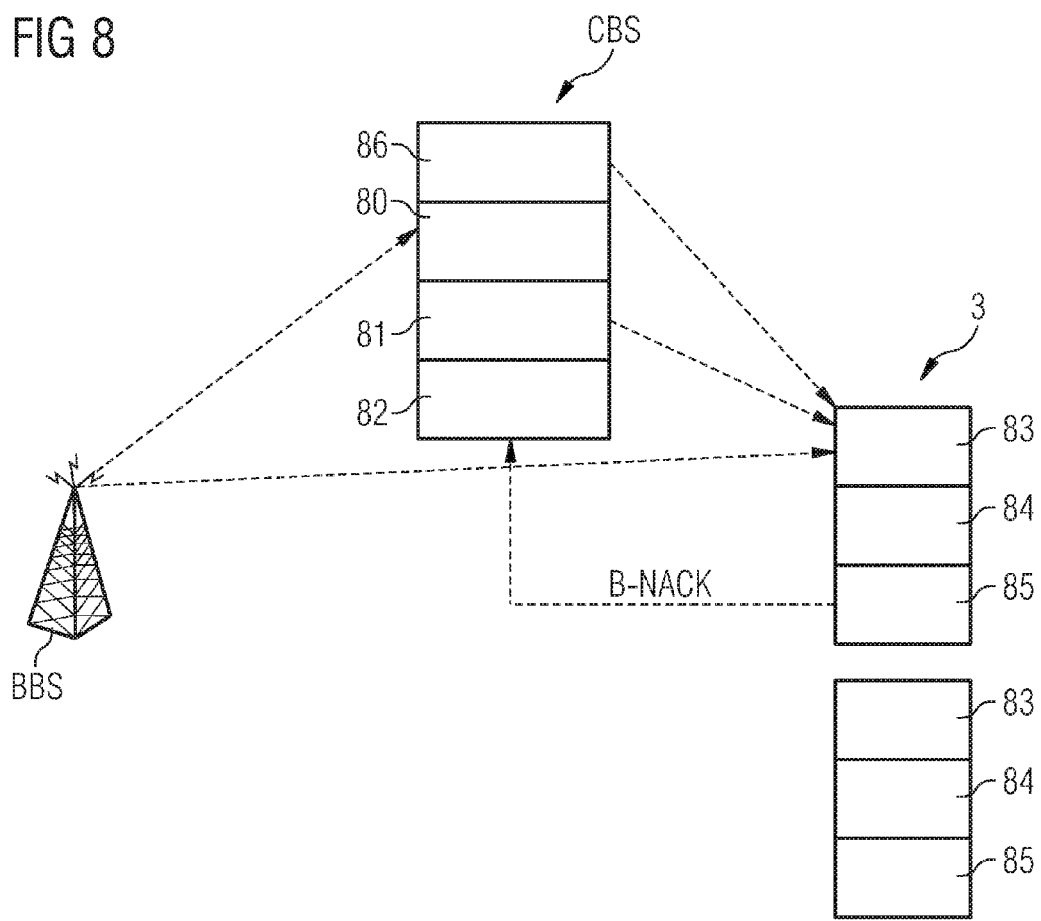
FIG. 8 shows details of the communication system of FIG. 1.

FIG. 8 shows details of the communication system of FIG. 1 with a broadcast base station BBS, a cellular base station CBS and a plurality of user equipments 3. The cellular base station CBS comprises a first receive unit 80 to receive data from the first base station BBS during the first sub-frame 20 and a retransmit unit 81 for retransmitting wirelessly the data received from the first base station BBS to at least one of the plurality of user equipments 3. A Transmit unit 86 is provided to transmit data during the downlink 23 of the second sub-frame 21.

The user equipment 3 comprises a receive unit 83 for receiving data packets from a first base station BBS during the first sub-frame 20. A decode unit 84 is provided for decoding data received from the first base station BBS and an acknowledgement unit 85 is provided for sending to the second base station CBS a request for data packets that were not entirely received from the first base station BBS.

The second base station CBS comprises a second receive unit 82 to receive the acknowledgment signal from the user equipment 3 to inform the retransmit unit 81 which data packets have to be retransmitted to the user equipment.

Advantages of the described method can be summarized as followed:
- A high spectrum efficiency is gained thanks to the reuse of the time resources in the broadcasting phase, in other words during the first sub-frame.
- A high spectrum efficiency is gained due to the possibility to use a higher rate modulation-coding scheme due to the employment of a relay.
- Less resources are wasted for cellular base stations being located at inner tiers with respect to the broadcasting base stations.

LIST OF ABBREVIATIONS

BBS Broadcasting Base Station
CBS Cellular Base Station
BWA Broadband Wireless Access
TDM Time Division Multiplex
UE User Equipment
BCG Broadcast Cellular Guard
DUG Downlink-Uplink Guard
FCH Frame Control Channel
MCS Modulation Coding Scheme
GMC Generalized Multi Carrier
RRC Radio Resource Control
MAC Medium Access Control
DLC Data Link Control
RLC Radio Link Control
PDU Protocol Data Unit

REFERENCE NUMBERS 1 communication network
2 cell
3 user equipment
20 first sub-frame
21 second sub-frame
22 broadcast cellular guard
23 downlink
24 downlink-uplink guard
25 uplink
26 forwarding phase
28 acknowledgment signal
80 first receive unit
81 retransmit unit
82 second receive unit
83 receive unit
84 decode unit
85 acknowledgement unit
86 transmit unit

The invention claimed is:

1. Method for transmitting data to user equipments, from a first base station (BBS) and from second base stations (CBS) in a time division multiplexed manner in frames (F), each frame (F) having a first sub-frame and a second sub-frame, the user equipments being located in cells, each cell comprising a second base station (CBS),
   transmitting wirelessly, during a first sub-frame of a frame, data from the first base station (BBS) to user equipments in a plurality of cells,
   transmitting wirelessly, during the second sub-frame of the frame (F), data from second base station (CBS) to at least one the plurality of user equipments,
   whereby the data being transmitted from the first base station (BBS) is at least partially also transmitted by the second base station (CBS) to at least one of the plurality of cells.

2. Method according to claim 1, characterized in that the second base station (CBS) receives wirelessly data from the first base station (BBS) during the first sub-frame and whereby the second base station (CBS) retransmits wirelessly the data received from the first base station (BBS) to at least one of the plurality of user equipments.

3. Method according to claim 2, characterized in that the second base station (CBS) retransmits the data at least partially during the second sub-frame.

4. Method according to claim 2, characterized in that the second base station (CSB) retransmits the data at least partially during the first sub-frame.

5. Method according to claim 1, characterized in that the first base station (BBS) sends the same data in a first frequency domain (high MSC) and concurrently in a second frequency domain (low MSC) during the first sub-frame.

6. Method according to claim 2, characterized in that the second base station (CBS) retransmits the data upon request of one of the user equipments to the one of the user equipments having sent the request.

7. Method according to claim 6, characterized in that the request is a negative acknowledgement signal (B-NACK).

8. Method according to claim 6, characterized in that the request includes an information which of the data packets are to be retransmitted.

9. Method according to claim 2, characterized in that the second base station (CBS) retransmits data during the frame (F) in which that the second base station receives the data from the first base station (BBS).

10. Method according to claim 2, characterized in that a data being retransmitted by the second base station (CBS) is coded by the same modulation-coding scheme as the modulation-coding scheme that the first base station (BBS) used to code said data packet.

11. Method according to claim 2, characterized in that the retransmitted data is sent during a forwarding phase and the second base station (CBS) sends a signal indicating the length of forwarding phase to the user equipment at the beginning of each forwarding phase.

12. Method according to claim 2, characterized in that the second base station (CBS) sends a signal indicating the modulation coding scheme (MCS) of the retransmission of data.

13. Method for receiving, by user equipment, data from a first base station (CBS) and from a second base station (BBS) in frames, each frame (F) having a first sub-frame and a second sub-frame, receiving, in the first sub-frame, data packets from the first base station (BBS), decoding the data received from the first base station (BBS), sending to the second base station (CBS) a request for data packets that were received from the first base station (BBS) with errors.

14. Method according to claim 13, characterized in that the request is a negative acknowledgement signal (B-NACK).

15. Method according to claim 13, characterized in that the request includes the number of the data packet to be retransmitted.

16. Method according to claim 13, characterized in a step of combining the data packets retransmitted from second base station (CBS) with the data packets received from the first base station (BBS).

17. Base station for transmitting data to user equipments in a time division multiplexed manner in frames, each frame having a first sub-frame and a second sub-frame, a transmit unit for transmitting wirelessly, during the second sub-frame of a frame, data from the second base station (CBS) to the plurality of user equipments, a first receive unit for receiving wirelessly data from another base station during the first sub-frame, and a retransmit unit for retransmitting wirelessly data received from the other base station (BBS) to at least one of the plurality of user equipments.

18. Base station according to claim 17, characterized in a second receive unit for receiving a request from a user equipment for retransmitting data, whereby the request is forwarded to the retransmit unit to retransmit the data if it is requested by the request from the user equipment.

19. Base station according to claim 18, characterized in that the request comprises a information which data packets of the data received by the first receive unit is requested and that the retransmit unit retransmits only the requested data packets to the user equipment.

20. User equipment for receiving wirelessly data from a first base station (BBS) and from a second base station (CBS) in a time division multiplexed manner in frames, each frame having a first sub-frame and a second sub-frame, a receive unit for receiving, in the first sub-frame, data packets from a first base station (BBS), a decode unit for decoding the data received from the first base station (BBS), an acknowledgement unit to send to the second base station (CBS) a request for data packets that were not entirely received from the first base station (BBS).

21. User equipment according to claim 20, characterized in that the request comprises an information indicating which data packets are requested.

22. Communication system for transmitting data to user equipments in a time division multiplexed manner in frames, each frame having a first sub-frame and a second sub-frame, a first base station (BBS) for transmitting wirelessly, during a first sub-frame of a frame (F), data to a plurality of user equipments, a second base station for transmitting wirelessly, during the second sub-frame of a frame (F), data from to the plurality of user equipments, whereby, the second base station (CBS) comprises a first receive unit for receiving data from the first base station (BBS) during the first sub-frame, and a retransmit unit for retransmitting wirelessly data received from the first base station (BBS) to at least one of the plurality of user equipments.

\* \* \* \* \*